UNITED STATES PATENT OFFICE.

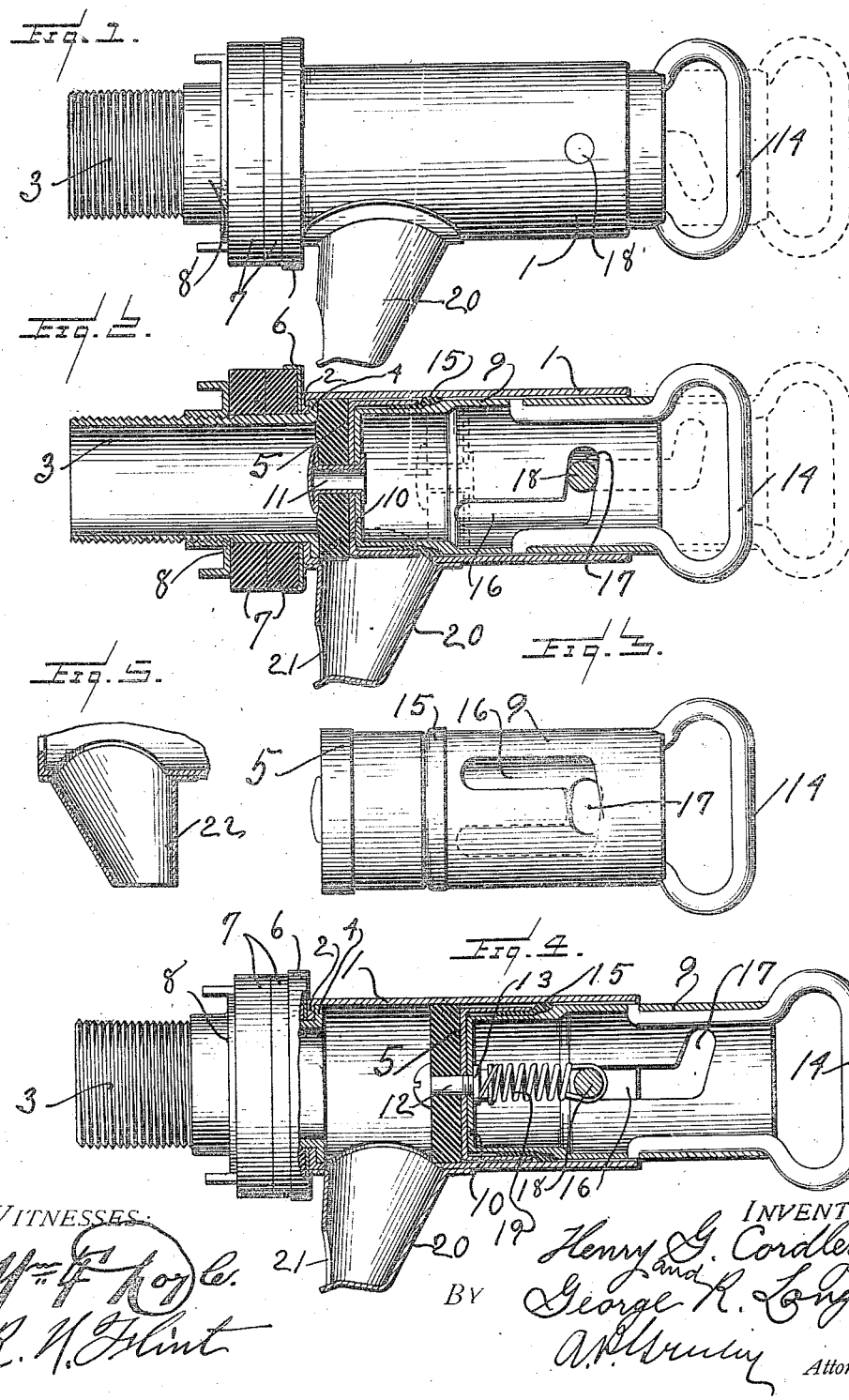

HENRY G. CORDLEY, OF GLEN RIDGE, NEW JERSEY, AND GEORGE R. LONG, OF WATERBURY, CONNECTICUT, ASSIGNORS TO SCOVILLE MANUFACTURING COMPANY, A CORPORATION OF CONNECTICUT.

FAUCET.

972,826.

Specification of Letters Patent. Patented Oct. 18, 1910.

Application filed August 21, 1909. Serial No. 514,028.

*To all whom it may concern:*

Be it known that we, HENRY G. CORDLEY and GEORGE R. LONG, citizens of the United States, residing, respectively, at Glen Ridge, in the county of Essex, State of New Jersey, and Waterbury, county of New Haven, State of Connecticut, have invented certain new and useful Improvements in Faucets, of which the following is a description, reference being had to the accompanying drawings, forming a part hereof.

Our invention relates to faucets designed especially for use with water coolers or filters for controlling the flow of waste water therefrom as distinguished from the water to be drunk, although the faucet is obviously capable of use for other purposes, and the objects of our invention are to provide a faucet which may be easily and cheaply manufactured, which will be attractive in appearance, which may be easily and quickly operated, and which will be effective for the purpose specified.

Our invention is illustrated in the accompanying drawing, described in the following specification, and particularly claimed in the clauses of the concluding claim.

In the drawing: Figure 1 is a view showing our faucet in side elevation, Fig. 2 is a view showing a section taken upon a vertical plane passing through the axis of the faucet, the valve of the faucet being shown in its closed position, Fig. 3 is a view showing an element of our faucet in side elevation, Fig. 4 is a sectional view similar to Fig. 2, the valve of the faucet being shown in its open position, and, Fig. 5 is a view showing a second form of discharge spout.

In the drawing, 1 represents the body portion of our faucet which is formed preferably from metallic tubing which may be readily purchased in the open market. The inner end of the body portion is provided with an inwardly turned flange 2, and 3 is an externally threaded nipple having an outwardly projecting flange 4 at its outer end which is in contact with the flange 3, the body portion and nipple being soldered together at the flanges to thereby form a single unitary element. The flange 4 forms a seat for the valve 5 of our improved faucet.

6 is a metallic washer surrounding the nipple 3 and resting against the inner end of the body portion 1 as shown, 7 are rubber washers to contact with the inner and outer surfaces of the receptacle to which the faucet is attached, and 8 is a nut in threaded engagement with the nipple 3.

9 is a valve operating member shown as in the form of a tube having its inner end closed as at 10, and the valve 5 is secured to the end 10 by means of a hollow rivet 11 in the embodiment of our invention shown in Fig. 2, while in Fig. 3 the valve is secured to the end 10 by means of a screw 12 having a grooved nut 13 within the valve operating member. The valve operating member is capable of longitudinal movement and also of rotary movement within the body portion 1, and it is provided with an operating handle 14 and with a packing 15, the valve operating member preferably fitting closely within the tubular body portion 1. The periphery of the valve operating member is provided with one or more cam grooves, two such grooves being shown, which grooves are located opposite one another and each of which comprises a straight portion 16 extending longitudinally of the operating member and a second portion 17 extending transverse to the portion 16 and to the operating member and at a slight angle to its axis as shown in the drawing. These cam grooves are shown as cut through the wall of the operating member 9, although our device operates in the same way, broadly considered, if the wall of the operating member be thicker than shown and the cam groove does not extend entirely through it. An abutment is provided which projects inwardly from the body portion 1 and into the cam groove aforesaid. We have illustrated this abutment as a rod 18 extending across the interior of the body portion and through both the cam grooves.

19 is a spring one end of which is secured to the rod 18 and the other to the grooved nut 13, the end of the spring being preferably soldered within the groove, although the method of securing either of the ends of the spring is of secondary importance. The length of the spring 18 is such that it will be under tension when the valve 5 is upon its seat and will tend to move the valve into its open position. While we prefer to use the spring above referred to it is not necessary that our faucet be provided with a spring in all cases; and it will be understood that the faucet shown in Fig. 2 is a complete and operative faucet notwithstanding it is not provided with a spring.

20 is a discharge spout, the discharge opening 21 of which is on its rear side so that water flowing through the faucet will be deflected backward and away from the person operating the faucet. This is for preventing one from accidentally drawing waste water from a cooler for drinking purposes, for the stream of water from the spout will not readily enter a glass but will be deflected backward against the body of the cooler and into the tray with which the coolers are provided, from which it flows into a waste water bucket. Fig. 5 shows a different form of spout 22 which will be provided when the faucet is to be used for general purposes.

Such being the construction of our faucet it will be understood that when the parts are in the position shown in Fig. 2 the rod 18 is within the transversely extending portions 17 of the cam groove and the valve 5 will be held against its seat. To open the faucet the valve operating member 9 is turned about its axis until the straight portion 16 of the cam groove comes in line with the rod 18, whereupon the valve operating member may be moved longitudinally of the body portion 1 and the valve 5 thus moved away from its seat and into the position shown in Fig. 4, the spring 19, if used, accomplishing this movement or assisting to that end according to the strength of the spring employed.

Having thus described our invention and explained the mode of operation thereof, we claim and desire to secure by Letters Patent:

1. In a faucet, a tubular body portion; a valve seat within said body portion; a valve coöperating with said seat; a tubular valve operating member within said body portion and closed at its inner end and capable of longitudinal and of rotary movements within said body portion and to the closed inner end of which said valve is secured, the periphery of said valve operating member being provided with two cam grooves located opposite one another and each comprising a portion extending longitudinally of said operating member and a second portion extending transverse thereto; and a rod extending across said body portion and through both of said cam grooves, the arrangement of the parts being such that when said valve is upon its seat said rod will be within the transversely extending portions of said cam grooves.

2. In a faucet, a tubular body portion; a valve seat within said body portion; a valve coöperating with said seat; a tubular valve operating member within said body portion and capable of longitudinal and of rotary movements therein and adapted to operate said valve, the periphery of said valve operating member being provided with two cam grooves located opposite one another and each comprising a portion extending longitudinally of said operating member and a second portion extending transverse thereto; and a rod extending across said body portion and through both of said cam grooves; the arrangement of the parts being such that when said valve is upon its seat said rod will be within the transversely extending portions of said cam grooves.

3. In a faucet, a tubular body portion; a valve seat within said body portion; a valve coöperating with said seat; a tubular valve operating member within said body portion and capable of longitudinal and of rotary movements therein and adapted to operate said valve, the periphery of said valve operating member being provided with a cam groove comprising a portion extending longitudinally of said operating member and a second portion extending transverse thereto; and an abutment extending inwardly from said body portion and into said cam groove, the arrangement of the parts being such that when said valve is upon its seat said abutment will be within the transversely extending portion of said cam groove.

4. In a faucet, a tubular body portion; a valve seat within said body portion; a valve coöperating with said seat; a valve operating member within said body portion and capable of longitudinal and rotary movement therein and adapted to operate said valve, said valve operating member being provided with a cam groove comprising a portion extending longitudinally of such operating member and a second portion extending transverse thereto; and an abutment extending inwardly from said body portion and into said cam groove.

5. In a faucet, a tubular body portion; a valve seat within said body portion; a valve coöperating with said seat; a valve operating member within said body portion and capable of longitudinal and rotary movement therein and adapted to operate said valve, said valve operating member being provided with a cam groove; an abutment extending inwardly from said body portion and into said cam groove; and a spring in engagement with said valve operating member and tending to move it outward to thereby move said valve from its seat.

6. In a faucet, a tubular body portion; a valve seat within said body portion; a valve coöperating with said seat; a tubular valve operating member within said body portion and capable of longitudinal and of rotary movements therein and adapted to operate said valve, the periphery of said valve operating member being provided with a cam groove comprising a portion extending longitudinally of said operating member and a second portion extending transverse thereto; an abutment extending inwardly from said body portion and into said cam groove, the arrangement of the parts being such that when said valve is upon its seat said abutment will be within the transversely extending portion of said cam groove; and a spring within said tubular valve operating member and in engagement therewith and tending to move it outward to thereby move said valve from its seat.

7. In a faucet, a tubular body portion; a valve seat within said body portion; a valve coöperating with said seat; a tubular valve operating member within said body portion and closed at its inner end and capable of longitudinal and of rotary movements within said body portion and to the closed inner end of which said valve is secured, the periphery of said valve operating member being provided with two cam grooves located opposite one another and each comprising a portion extending longitudinally of said operating member and a second portion extending transverse thereto; a rod extending across said body portion and through both of said cam grooves, the arrangement of the parts being such that when said valve is upon its seat said rod will be within the transversely extending portions of said cam grooves; and a spring within said valve operating member, one end of which is connected with the closed inner end of said member and the other end of which is connected with said rod.

8. In a faucet, a body portion; a valve for controlling the flow of liquid therethrough; and a discharge spout through which the liquid is discharged, said discharge spout having a closed lower end and a discharge opening upon its rear side so that the stream of water flowing through the faucet will be directed backward and away from the operator.

This specification signed in the presence of witnesses.

HENRY G. CORDLEY.
GEORGE R. LONG.

Witnesses to the signature of Henry G. Cordley:
GEORGE B. WILLIAMS,
WILLIAM M. REIS.

Witnesses to the signature of George R. Long:
GEO. T. POWER,
M. L. SPERRY.